United States Patent Office 3,053,047
Patented Sept. 11, 1962

3,053,047
FUEL FEED AND POWER CONTROL SYSTEM
FOR GAS TURBINE ENGINES
Rudolph Bodemuller, South Bend, Ind., assignor to The
Bendix Corporation, a corporation of Delaware
Filed May 27, 1953, Ser. No. 357,661
16 Claims. (Cl. 60—39.28)

The present invention relates to a fuel control system and more particularly to a fuel control system and a method of operation for gas turbine engines.

In acceleration of gas turbine engines, particularly those embodying an axial flow compressor, a phenomenon known as compressor stall or surge may be encountered in which the back pressure of compressor exceeds some critical value, usually resulting in a sudden and drastic reduction in the quantity of air delivered to the burners. If this condition is not immediately relieved by reducing the fuel delivery to the engine, the burner temperatures and the vibratory stresses induced in the compressor may become sufficiently high to cause serious damage to the engine. Most of the fuel controls now in use on gas turbine engines include a mechanism which schedules the fuel flow during acceleration such that the compressor stall region for the particular engine is avoided. In determining the schedule, however, a substantial safety margin must be provided which necessarily decreases the rate at which the engine can be accelerated, particularly since the compressor surge region varies with variations in engine operating conditions. It is therefore one of the principal objects of the present invention to provide a fuel control system for gas turbine engines which will permit maximum acceleration throughout the entire operating range of the engine.

Another object of the invention is to provide a fuel control device for gas turbine engines which will anticipate the approach of the compressor stall condition and respond instantaneously to prevent the engine from reaching that condition.

A further object of the invention is to produce a signal which indicates the condition under which a gas turbine engine is operating during various stagees of acceleration.

A further object is to provide a mechanism which is capable of sensing variations in the aforesaid signal and responding promptly thereto to deliver the required fuel flow to the engine.

A still further object of the invention is to provide a method of sensing the approach of compressor stall.

Additional objects and advantages of the invention will become apparent from the following description with reference to the accompanying drawings, wherein.

The present invention involves a fuel control mechanism and method of operation in which a predetermined fuel flow oscillation is superimposed on the fuel delivered to the engine to produce pulsations in the compressor discharge pressure. The pulsations in compressor discharge pressure are the direct result of variations in burner temperatures and correspond uniformly in amplitude and frequency to the fuel flow modulation except during acceleration of the engine. As the engine accelerates, the amplitude of the pulsations in compressor discharge pressure gradually diminishes as the engine approaches the compressor stall stage, reaching almost zero as this stage is entered. The present invention utilizes the variations in the compressor pressure pulsations to control the engine fuel system to obtain maximum acceleration without danger of compressor stall.

Figure 1:
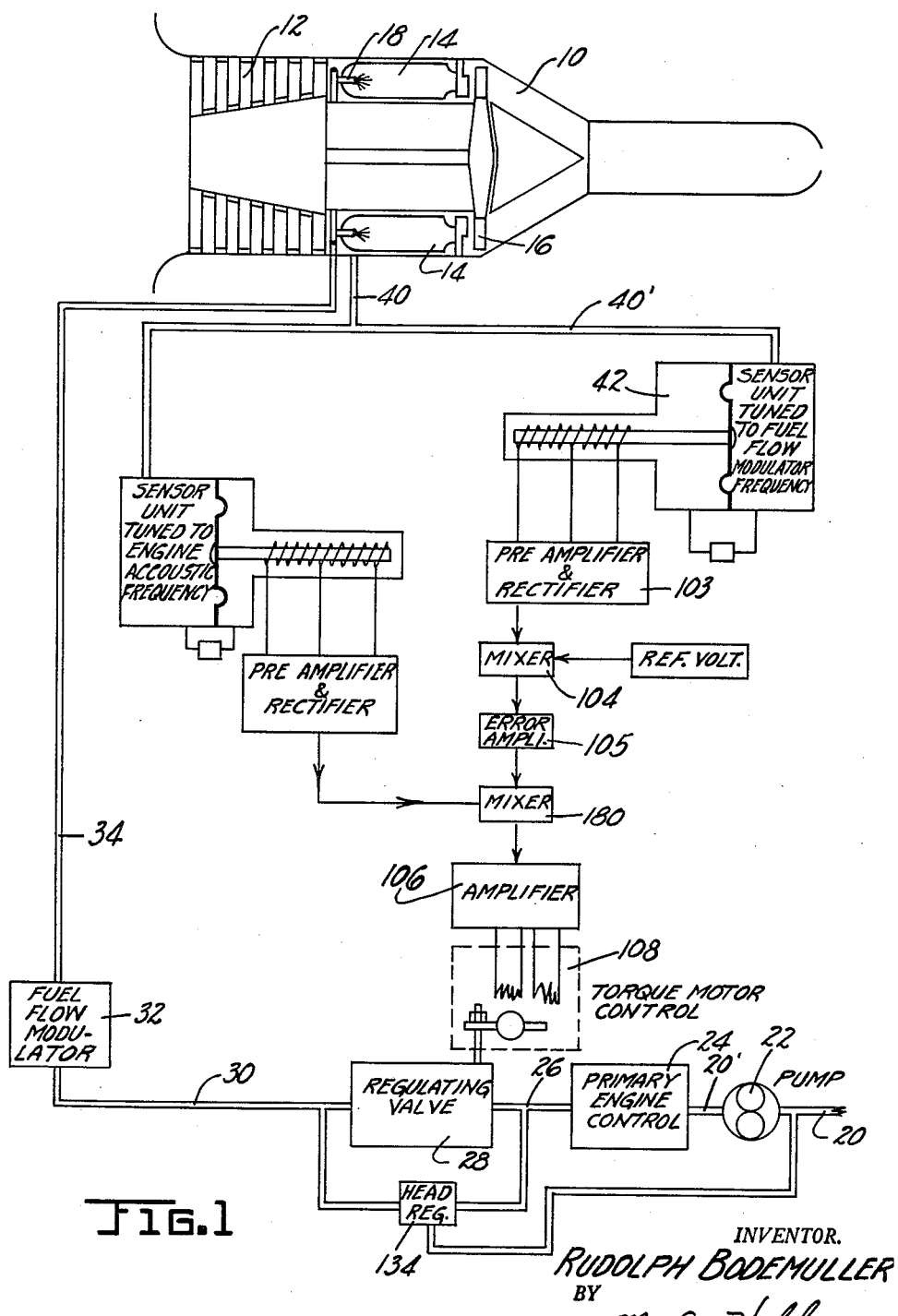
FIGURE 1 is a block diagram showing part of a gas turbine engine and various components of a device or system embodying my invention.
Figure 2:
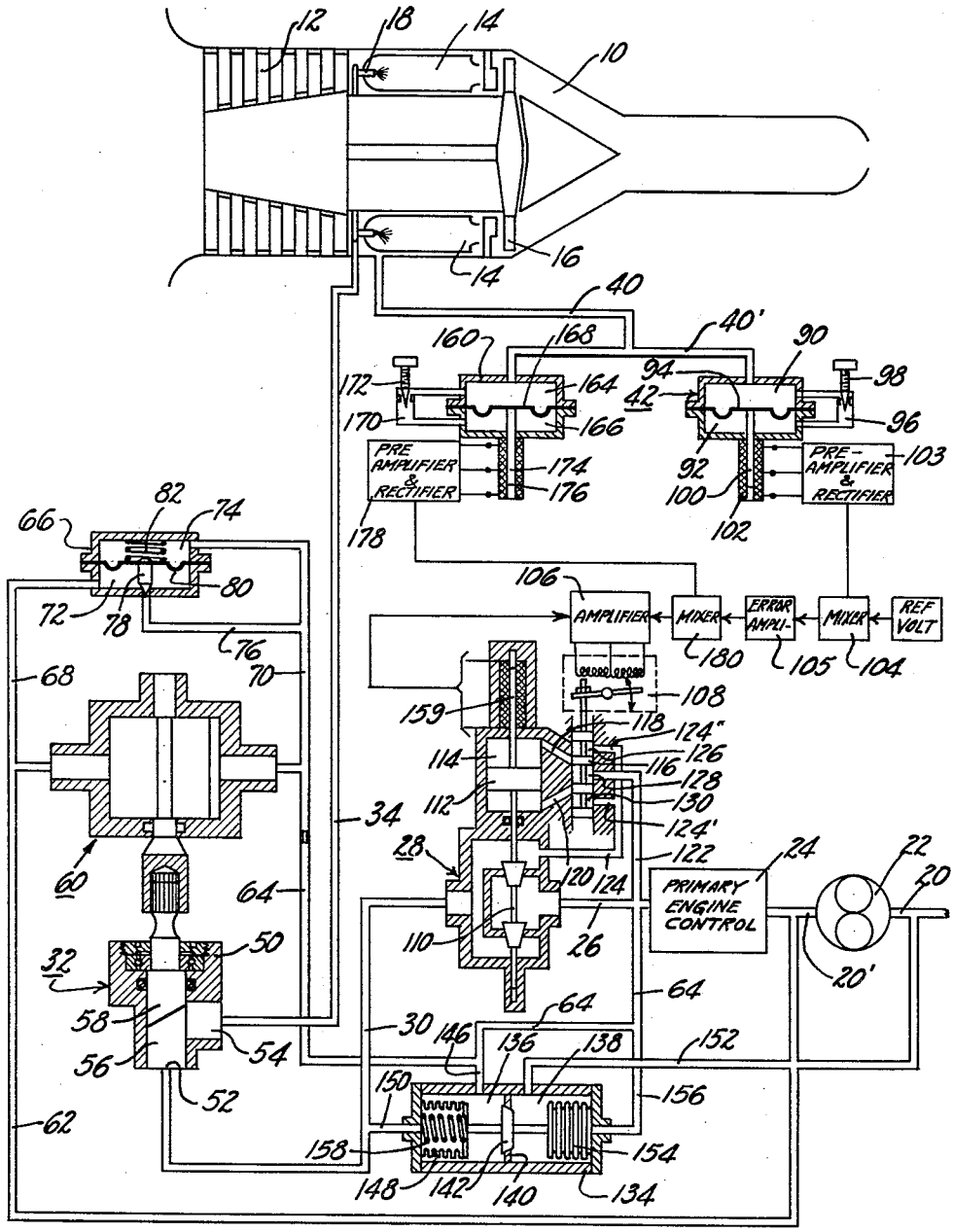
FIGURE 2 is a schematic diagram showing one embodiment of my fuel control device.

Referring more specifically to the drawings and to FIGURE 1 in particular, numeral 10 designates a gas turbine engine having an axial flow compressor 12, burners 14, turbine 16 and fuel discharge nozzles 18 disposed in burners 14. Fuel for the engine is delivered from a tank or the like (not shown) through conduit 20, and pump 22 to a primary fuel control unit 24, of any well-known type, controlled by the pilot. On leaving the control unit 24, the fuel passes through conduit 26, regulating valve unit 28, and conduit 30, to a modulator or pulsator 32 and from there through conduit 34 to nozzles 18 and is discharged into burners 14. The pulsations created in the fuel flow to the burners by modulator 32 produce a corresponding variation in the temperature in the burners and consequently in the back pressure at the discharge end of compressor 12 during the time the engine is operating in a steady state condition. The pulsations thus created in the compressor discharge pressure are picked up by conduit 40 and transmitted through conduit 40′ to a sensor unit 42 where they are converted into an electrical signal which is compared with a reference voltage and amplified for use in operating regulating valve 28 to prevent compressor stall when variations in amplitude of compressor discharge pressure pulsations indicate the approach of the stall condition.

The modulator 32 consists of a housing 50 having a fuel inlet 52, a fuel outlet 54 connected by a chamber 56 having disposed therein a rotor 58, which is shown as a shaft like member having a beveled end for varying the size of the outlet 54 within a limited range with each revolution of the rotor to cause a pulsating flow in conduit 34 to nozzles 18. The rotor 58 in the embodiment of FIGURE 1 is driven at a constant speed by a hydraulic motor 60 connected by a conduit 62 to conduit 20′ between pump 22 and the primary control 24 and to conduit 26 on the downstream side of the primary control 24 by a conduit 64. In order to maintain the speed of the hydraulic motor constant, a constant head regulator 66 is connected across the motor and contains a chamber 72 connected to conduit 62 by conduit 68 for motor inlet pressure and a chamber 74 connected to conduit 64 by conduit 70 for motor outlet pressure, said latter conduit being connected to chamber 72 by a conduit 76 to form the outlet for said chamber. The fuel outlet of chamber 72 is controlled by a valve 78 regulated by a flexible diaphragm 80 urged in the valve closing direction by a coil spring 82 which determines the drop in pressure from the inlet to the outlet of the motor.

The pulsations created in the compressor outlet pressure by the pulsating fuel flow are transmitted through conduits 40 and 40′ to sensor unit 42 which contains two resonating chambers 90 and 92 separated by a diaphragm 94 and connected to one another by a conduit 96 controlled by a valve like member 98 for tuning the sensor to the pulsations of the compressor discharge pressure.

The vibrations of the diaphragm actuate an armature 100 of a coil 102 and are thereby converted into an electrical signal of a frequency and amplitude corresponding to the pulsations of the compressor discharge pressure. This electrical signal is fed through an amplifier and rectifier 103 into a mixer 104 where it is compared to a reference voltage and the resulting error signal is then amplified by amplifiers 105 and 106. Any suitable rectifiers, mixers and amplifiers, such as those disclosed in applications Serial No. 347,886 filed April 10, 1953, now Patent No. 2,993,327 and 367,045 filed July 9, 1953, now Patent No. 2,841,336 may be employed in the electrical system. An electrical voltage corresponding to the error signal operates a torque motor 108 to control regulator valve 28 to decrease the fuel flow to the engine if the compressor outlet pressure pulsation indicates that the engine is approaching the compressor stall region.

The regulator valve unit 28 consists of a balance valve 110 controlled by a piston 112 in cylinder 114. The operation of piston 112 is controlled by motor 108 through valve 116 which is connected to each side of said piston by conduits 118 and 120 and to conduit 26, as a source of operating pressure, by conduit 122. A conduit 124 and branch conduits 124' and 124" are provided to relieve the pressure on either side of the piston as the valve 116 is moved to regulate valve 110 in controlling the piston. The movable member of valve 116 forms three shiftable chambers 126, 128 and 130, chamber 128 being adapted to connect conduit 122 with conduit 118 to move piston 112 in the direction to close valve 110 and with conduit 20 to move the piston in the direction to open the valve.

A constant pressure drop is maintained across the regulating valve by a pressure regulator unit 134 consisting of a fuel inlet chamber 136 and a fuel outlet chamber 138 separated by a partition 140 having an orifice therethrough controlled by a valve 142. The inlet chamber is connected by conduits 146 and 64 to conduit 26 upstream of regulating valve unit 28 and contains a bellows 148 connected by conduit 150 to conduit 30 downstream of said unit. The outlet chamber is connected by conduit 152 to conduit 20 anterior to pump 22 and contains a bellows 154 connected by conduits 156 and 64 to conduit 26. The two bellows operate valve 142 which is urged toward closed position by a spring 158 disposed in bellows 148.

To prevent the regulating valve from traveling further than required to properly control the engine, an anticipator which includes an electrical coil 159 having an armature actuated by the movement of piston 112, senses the rate of travel of piston 112 and modifies said rate as the desired position of the valve is being approached and thus prevents overshooting and hunting of the valve 110.

A unit 160 is included to override the normal fuel control mechanisms in the event unit 42 fails and the engine actually reaches the compressor stall stage. This contains two resonating chambers 164 and 166 separated by a diaphragm 168 and connected to one another by a conduit 170 controlled by a valve like member 172 for tuning the vibrations of the diaphragm to the engine acoustic resonance frequency, which is always encountered when the engine is operating in the compressor stall region. The vibrations of the diaphragm actuate an armature 174 of coil 176 and are there converted into an electrical signal of a frequency and amplitude corresponding to the engine resonance pulsation. The electrical signal is fed through an amplifier and rectifier 178 into a mixer 180 in the previously mentioned circuitry and, if the signal indicates that the compressor stall stage has been reached, causes regulator valve 28 to move toward closed position to prevent damage to the engine.

Figure 4:
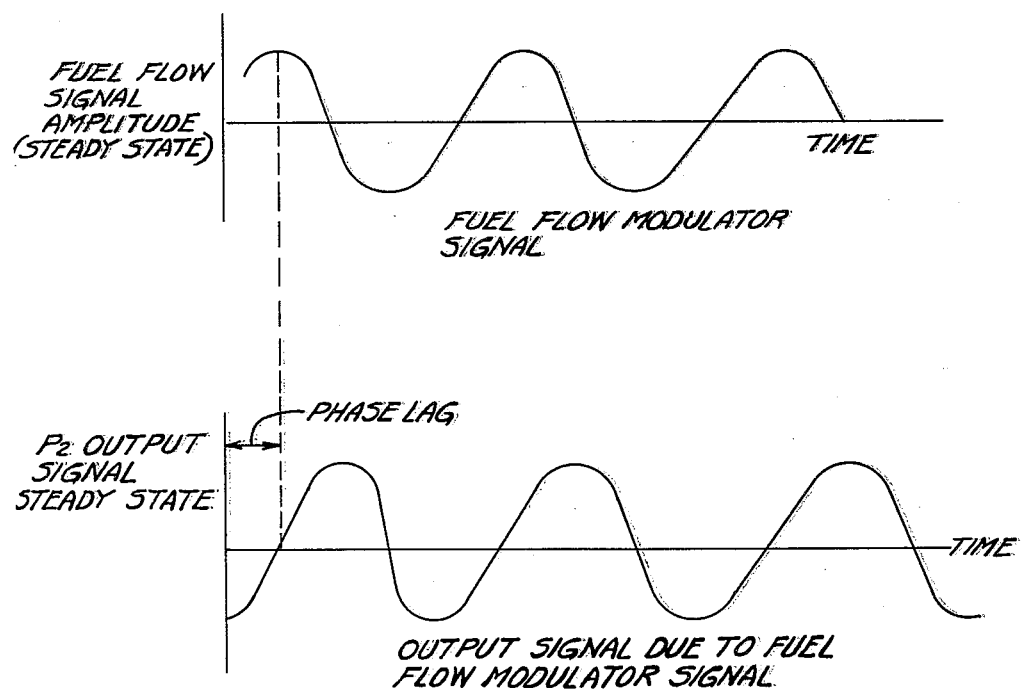
FIGURES 4 and 5 are curves showing the effect of fuel flow modulation on compressor outlet pressure under various operating conditions.

In the operation of the present control mechanism, when the engine is operating at steady state, for example during idling, fuel flow modulator 32 creates continuous pulsations of small amplitude in the fuel flow to the engine burners. This pulsating fuel flow causes a corresponding variation in burner temperatures which in turn causes a like variation in back pressure at the compressor outlet; hence during steady state operating conditions the compressor discharge pressure pulsations follow uniformly the fuel flow pulsations. The pulsations of the compressor discharge pressure are transmitted to the sensor unit 42 where they are converted into an electrical signal by armature 100 and coil 102. This signal is compared with a reference voltage in mixer 104 and at steady state the error voltage which appears at the torque motor urges valve 110 to its fully open position. In FIGURE 4 the curve showing the pulsations of the fuel flow produced by modulator 32 in the fuel metered by the primary control 24 and the curve showing those of the signal produced by pulsations in the pressure discharge pressure ($P_2$) show that the modulation of these two are characteristically the same, in this example, consisting of a relatively low amplitude sinusoidal oscillation.

Figure 5:
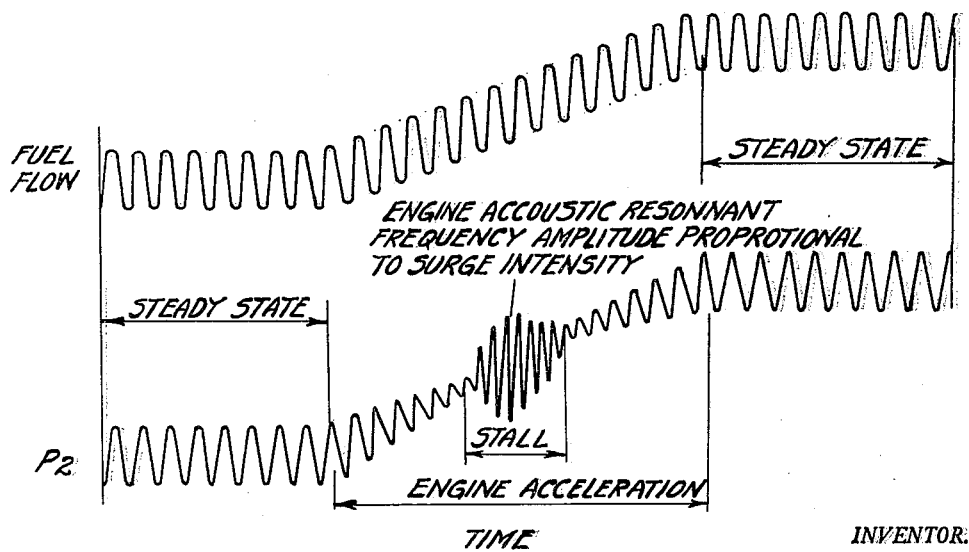
Figure 6:
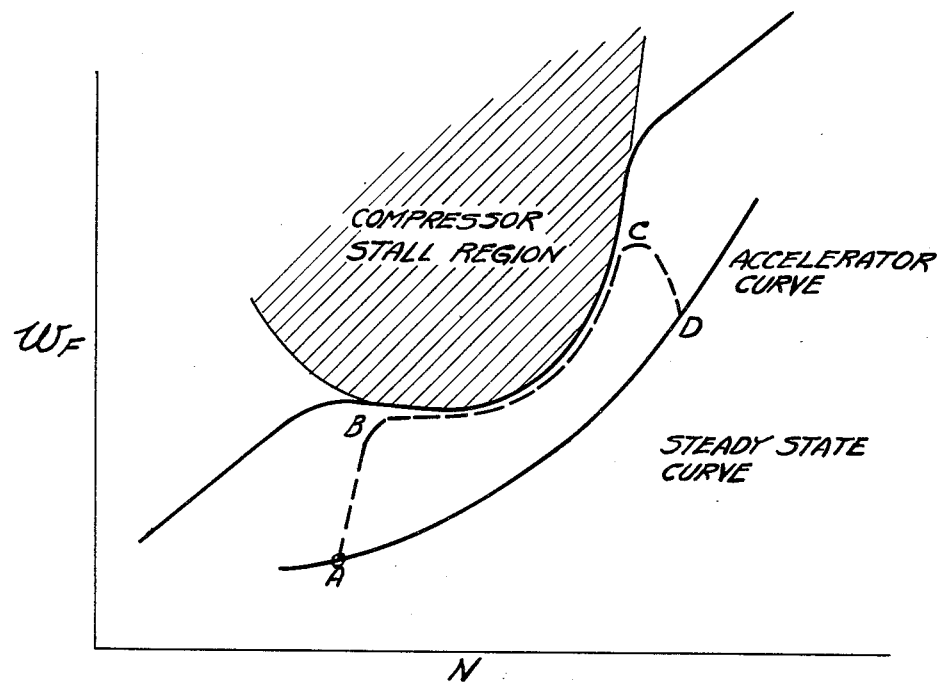
FIGURE 6 is a curve showing fuel flow plotted against engine turbine speed.

When the pilot desires to accelerate the engine, the primary control 24 is regulated to increase the fuel flow. The modulator 32 continues to produce the pulsating flow throughout the acceleration range. As shown in FIGURE 5 the fuel flow pulsations remain constant in frequency and amplitude throughout this range; however, some predetermined varying amplitude may be used. The pulsations in compressor discharge remain constant in frequency until compressor stall stage is reached but decrease in amplitude to almost zero from the beginning of acceleration range to the compressor stall stage and increase in amplitude from the stall stage to steady state. It is the diminishing pulsation amplitude which, after being converted to an electrical signal by sensor unit 42, is compared with the reference voltage, amplified and converted into an electrical voltage for operating torque motor 108 to decrease the fuel flow through valve unit 28 in the event the operation of the engine approaches closely to the compressor stall region. The engine accelerates, as shown in FIGURE 6 where fuel flow ($W_f$) is plotted against engine speed (N), from point A on the steady state curve along the broken line to point B where it approaches the compressor stall region, skirts this region until the desired speed is reached at point C and then drops to point D on the steady state curve. By sensing the change in compressor outlet pressure pulsations and using this as a signal to detect the approach of compressor stall, it is seen that the engine can be safely accelerated near the permissible maximum compressor stall limit, thus reducing to a minimum the time required for acceleration.

Figure 3:
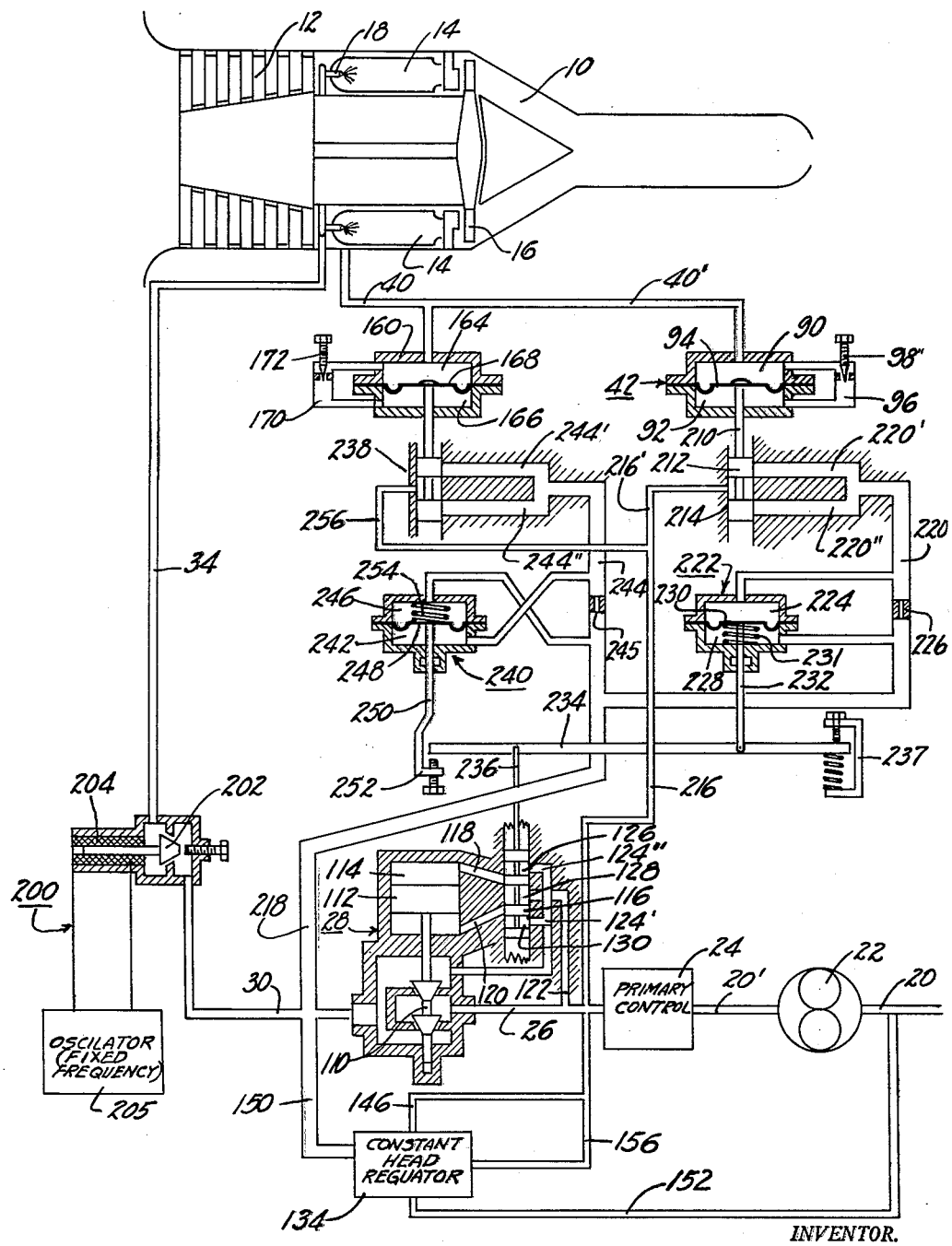
FIGURE 3 is a schematic diagram of another embodiment of my fuel control device.

In the modification of the present invention shown in FIGURE 3, wherein elements found in the preceding figures are given like numbers, the electrical sensing and amplifying mechanisms have been replaced by a hydro-mechanical mechanism and the mechanical modulator 32 has been replaced by an electrically actuated unit. In the latter unit a valve assembly 200 contains a valve element 202 operated by a solenoid 204 to move it between predetermined limits less than fully opened or closed, the operation of the solenoid being controlled by an oscillator 205. The pulsations created in the fuel line to the burners by the modulator unit are the same in character as those produced by unit 32. The pulsations in the compressor discharge pressures are transmitted to sensor unit 42 where they cause diaphragm 94 to vibrate and operate stem 210 to reciprocate valve 212 of valve unit 214. The latter unit is connected with conduit 26 on the upstream side of valve unit 28 by conduits 216 and 216' and with conduit 30 on the downstream side of unit 28 by conduits 218 and 220. Valve 212 controls the flow of fuel from conduit 216' to branch conduits 220' and 220" of conduit 220 and consequently the pressure in actuator 222. This actuator contains a chamber 224 connected to conduit 220 anterior to a restriction 226 and another chamber 228 connected to conduit 220 posterior to restriction 226 and separated from the first chamber by diaphragm 230 which together with a spring 231 actuates valve member 116 through a linkage consisting of rod 232, lever 234 and stem 236. Lever 234 is pivoted on a support 237 which is made adjustable to permit the position of the lever to be shifted to make minor adjustments in the position of valve member 116.

In this arrangement, as diaphragm 94 is vibrating uniformly during steady state operation of the engine, valve 212 opens and closes branch conduits 220' and 220", creating uniformly pulsating pressure in conduit 220 above restriction 226 and in chamber 224, and a substantially constant pressure drop between chambers 224 and 228. During this time, the deflection of diaphragm 230 is sufficient to hold valve 116 in the position to connect conduits 120 and 122 and thereby retain regulating valve 110 in its fully opened position. As the pulsations in compressor discharge pressure decreases during acceleration, a corresponding decrease occurs in the magnitude of the vibrations of diaphragm 94 which causes a decrease in the movement of valve 212. This results in a lowering of the pressure in conduit 220 above restriction 226 and consequently a lesser pressure drop across said restriction and likewise across diaphragm 230. The diaphragm spring 231 operating through rod 232, lever 234 and stem 236 moves valve 116 upwardly to connect conduit 118 with conduit 122 through chamber 128 and thereby move piston 112 in the direction to close valve 110, thus avoiding compressor stall.

Unit 160 is also included in this system and operates a valve unit 238 to produce a pressure differential in an actuator 240. This actuator contains a chamber 242 connected to conduit 244 above a restriction 245 and another chamber 246 connected to conduit 244 below said restriction. A diaphragm 248 separates chambers 242 and 246 and is connected to a rod 250 which has an adjustable abutment 252 for engaging the free end of lever 234. Rod 250 is moved in the direction to disengage the abutment from lever 234 by a coil spring 254 in chamber 246. The valve unit 238 is connected with conduit 216 by conduit 256 and with conduit 218 by conduit 244 and branch conduits 244' and 244", and operates in the same manner as unit 214 in response to the vibration of diaphragm 168 of unit 160. Unit 160 is tuned to the acoustic resonance of the engine and, if the engine enters the stall stage should unit 42 fail, the resulting acoustic resonance actuates sensor 160 such that the diaphragm begins to vibrate and operates valve 238 in the manner previously explained with reference to valve 212, thus producing a substantial pressure differential across diaphragm 248, moves rod 250 in the direction to cause valve 28 to move toward closed position. The fuel flow is decreased sufficiently to return the engine to normal operating conditions.

Although only two specific examples of my invention have been included in the description it will be understood that many variations may be made without departing from the scope of the invention. It is contemplated that other elements or devices than those shown in the drawings may be included in the present systems to compensate for variations in engine operating conditions.

I claim:

1. In a fuel system for a gas turbine engine having a compressor and a burner, a conduit for delivering fuel from a source of supply to the burner, a regulating valve for controlling the flow of fuel through said conduit, a means for producing pulsations in the fuel flowing through said conduit to said burner to create pulsations in an engine operating condition, a means for sensing the pulsations in said condition, an always open conduit connected to transmit said last named pulsations from said engine to said last named means, and a means responsive to said sensing means for controlling said valve.

2. In a fuel system for a gas turbine engine having a compressor and a burner, a conduit for delivering fuel from a source of supply to the burner, a regulating valve in said conduit, a means posterior to said valve for producing pulsations in the fuel flowing through said conduit to said burner to create pulsations in an engine operating condition, a means for sensing the pulsations in said condition, including a pressure responsive member and an unrestricted passage connected to transmit said pressure pulsations from said engine to said pressure responsive member, and a means actuated by said sensing means for moving said valve toward closed position when the pulsation in said condition indicates the approach of compressor instability.

3. In a fuel system for a gas turbine engine having a compressor and a plurality of burners, a conduit for delivering fuel from a source of supply to the burners, a regulating valve in said conduit, a means for controlling the drop in pressure across said valve, a means in flow controlling relation to said valve for producing pulsations in the fuel flowing through said conduit to said burners to create pulsations in an engine operating condition, a means for sensing the pulsations in said condition, and a means actuated by said sensing means for moving said valve toward closed position when the pulsations in said condition indicate the approach of compressor stall.

4. In a fuel system for a gas turbine engine having a compressor and a plurality of burners, a conduit for delivering fuel from a source of supply to the burners, a primary fuel control in said conduit, a regulating valve in said conduit in flow controlling relation to said control, a means for producing pulsations in the fuel flowing through said conduit to said burners to create pulsations in an engine operating condition which are caused to vary in a predetermined manner to indicate the approach of compressor instability, a means for sensing the pulsations in said condition, and a means responsive to said sensing means for controlling said valve in a closing direction when the pulsations in said condition indicate the approach of compressor instability.

5. In a fuel system for a gas turbine engine having a compressor and a burner, a conduit for delivering fuel from a source of supply to the burner, a fuel control means for controlling the flow of fuel through said conduit, a means for producing pulsations in the fuel flowing through said conduit to said burner to create pulsations in a compressor operating pressure, said pulsations having a relatively constant amplitude which is caused to diminish as the compressor approaches a condition of instability, a means for sensing the pulsations in said pressure, and a means responsive to said sensing means for controlling said fuel control means to cause a decrease in the flow of fuel to the burner in response to said pulsations indicating the approach of compressor instability.

6. In a fuel system for a gas turbine engine having a compressor and a plurality of burners, a conduit for delivering fuel from a source of supply to the burners, a pressure creating means in said conduit, a fuel control means for controlling the flow of fuel through said conduit, a means for producing pulsations in the fuel flowing through said conduit to said burners to create pulsations in an engine operating condition, a means for sensing the pulsations in said condition, and a means actuated by said sensing means for operating said fuel control means to cause a decrease in fuel flow to the burners when the pulsations in said condition indicate the approach of compressor instability.

7. In a fuel system for a gas turbine engine having a compressor and a plurality of burners, a conduit for delivering fuel from a source of supply to the burners, a fuel pump in said conduit, a primary fuel control in said conduit and in fuel flow controlling relation to said pump, a regulating valve in said conduit posterior to said control, a means for maintaining a substantially constant drop in pressure across said valve, a means for producing pulsations in the fuel flowing through said conduit to said burners to create pulsations in a compressor operating pressure, a means for sensing pulsations in an engine operating condition, and a means actuated by said sensing means for moving said valve toward closed position when the pulsations in said condition indicate the approach of compressor stall.

8. In a fuel system for a gas turbine engine having a plurality of burners and a compressor which has a characteristic range of unstable operation, a conduit for delivering fuel from a source of supply to the burners, a regulating valve in said conduit, a means for producing pulsations in the fuel flowing through said conduit to said burners to create pulsations in an engine operating condition, a means for sensing the pulsations in said operating condition, said pulsations in the operating condition varying in a predetermined manner in response to the approach of said characteristic unstable operating condition of the compressor, a means responsive to said sensing means for controlling said valve, a means for converting said pulsations into an electrical signal, a means for converting said signal into an electrical current corresponding to said signal, and an electrical means adapted to be energized by said current for controlling said regulating valve in a closing direction when said pulsations indicate the approach of said characteristic unstable operating condition of the compressor.

9. In a fuel system for a gas turbine engine having a compressor and a plurality of burners, a conduit for delivering fuel from a source of supply to the burners, a regulating valve in said conduit, a means for controlling the drop in pressure across said valve, a means in flow controlling relation to said valve for producing pulsations in the fuel flowing through said conduit to said burners to create pulsations in an engine operating condition, a means for sensing the pulsations in said condition, a means actuated by said sensing means for moving said valve in a fuel flow decreasing direction when the pulsations in said condition indicate the approach of compressor instability, a means for converting said pulsations into an electrical signal, a means for converting said signal into an electrical current corresponding to said signal, and an electrical motor adapted to be energized by said current for controlling said regulating valve.

10. In a fuel system for a gas turbine engine having a compressor and a plurality of burners, a conduit for delivering fuel from a source of supply to the burners, a fuel pump in said conduit, a primary fuel control in said conduit in flow controlling relation to said pump, a regulating valve in said conduit posterior to said control, a means for maintaining a substantially constant drop in pressure across said valve, a means for producing pulsations in the fuel flowing through said conduit to said burners to create pulsations in an engine operating condition, said pulsations having a predetermined amplitude under normal operating conditions of said compressor and being caused to diminish in amplitude as the compressor appoaches a condition of instability, a means for sensing the pulsations in said condition, a means for converting said pulsations into an electrical signal, a means for converting said signal into an electrical current corresponding to said signal, and an electrical motor adapted to be energized by said impulse for controlling said regulating valve in a closing direction to decrease the flow of fuel to said burners when said pulsations indicate the approach of compressor instability.

11. In a fuel system for a gas turbine engine having a compressor and a plurality of burners, a conduit for delivering fuel from a source of supply to the burners, a regulating valve for controlling the flow of fuel through said conduit, a means in flow controlling relation to said valve for producing pulsations in the fuel flowing through said conduit to said burners to create pulsations in an engine operating condition, a means for sensing the pulsations in said condition, a means actuated by said sensing means for moving said valve in a flow decreasing direction when the pulsations in said condition indicate the approach of compressor instability, a means for sensing the acoustic resonance frequency to determine when the engine enters the region of compressor instability, and a means actuated in response to said last named means for overriding the first mentioned sensing means to move said valve in a flow decreasing direction.

12. In a fuel system for a gas turbine engine having a compressor and a plurality of burners, a conduit for delivering fuel from a source of supply to the burners, a primary fuel control in said conduit, a regulating valve in said conduit in flow controlling relation to said control, a means for producing pulsations in the fuel flowing through said conduit to said burners to create pulsations in a compressor operating pressure, a means for sensing the pulsations in said pressure, a means responsive to said sensing means for controlling said valve, a means for sensing the acoustic resonance frequency to determine when the engine enters the compressor stall region, and a means actuated in response to said last named means for overriding the said first mentioned means and said primary fuel control to decrease the fuel flow to the engine.

13. In a fuel system for a gas turbine engine having a compressor and a plurality of burners, a fuel conduit adapted to be connected to said burners, a fuel pump in said conduit, a primary fuel control in said conduit posterior to said pump, a regulating valve in said conduit posterior to said control, a means in said conduit posterior to said valve for superimposing on the normal fuel flow as determined by said primary control a low amplitude uniform oscillation for creating a predetermined pulsation component in the compressor outlet pressure which diminishes in amplitude as the compressor approaches a condition of instability, and a means for controlling said valve in a closing direction to cause a decrease in the flow of fuel to the burners in response to said pulsation component diminishing in amplitude as the condition of instability of the compressor is approached.

14. A method of controlling a gas turbine engine having a compressor and a plurality of burners, comprising pressurizing fuel for delivery to the burners, metering said pressurized fuel, creating pulsations in the flow of said metered fuel to produce pulsations in a compressor operating pressure, said pulsations being characterized by a decrease in amplitude as the compressor approaches a condition of instability, sensing said pressure pulsations to produce a signal, and utilizing said signal to cause a decrease in the fuel flow to the burners when said pulsation decrease in amplitude as the compressor approaches said condition of instability.

15. A method of controlling a gas turbine engine having a compressor and a burner, comprising pressuring fuel for delivery to the burner, metering said pressurized fuel, creating pulsations in the flow of said metered fuel to produce pulsations in an engine condition of operation which vary in a predetermined manner in response to the approach of an unstable operating condition of said compressor, and utilizing said pulsations to cause a decrease in the fuel flow to the burner when said pulsations vary in said predetermined manner to indicate the approach of said unstable operating condition of the compressor.

16. A method of controlling a gas turbine engine having a compressor and a burner, comprising pressurizing fuel for delivery to the burner, creating pulsations in the flow of said fuel to produce pulsations in the compressor discharge pressure which vary in a predetermined manner in response to the approach of compressor instability, and utilizing said pulsations to cause a decrease in the fuel flow to the burner when said pulsations vary in said predetermined manner to indicate the approach of said unstable operating condition of the compressor.

References Cited in the file of this patent

UNITED STATES PATENTS

| | | |
|---|---|---|
| 2,555,445 | Hooker et al. | Mar. 5, 1951 |
| 2,570,591 | Price | Oct. 9, 1951 |
| 2,573,724 | Neal | Nov. 6, 1951 |
| 2,629,225 | Ammann | Feb. 24, 1953 |
| 2,715,815 | Malick et al. | Aug. 23, 1955 |
| 2,747,366 | Lewis et al. | May 29, 1956 |
| 2,750,741 | Leeper | June 19, 1956 |
| 2,761,284 | Malick | Sept. 4, 1956 |
| 2,795,929 | Hazen | June, 18 1957 |